May 19, 1925.  1,538,277
C. C. DULA
ART OF PACKING AND PRESERVING FRUITS AND
OTHER FOOD PRODUCTS AND COMMODITIES
Filed Feb. 8, 1924   3 Sheets-Sheet 1
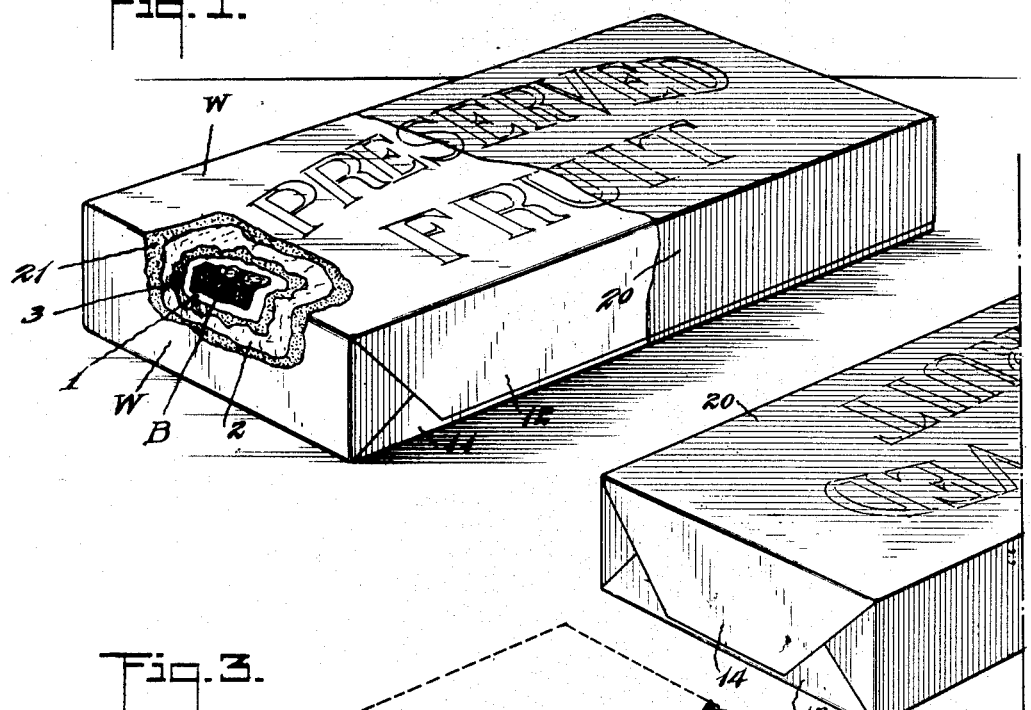
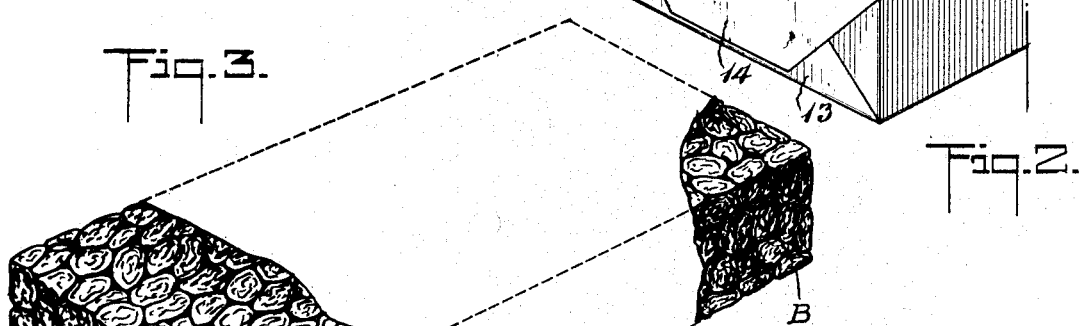
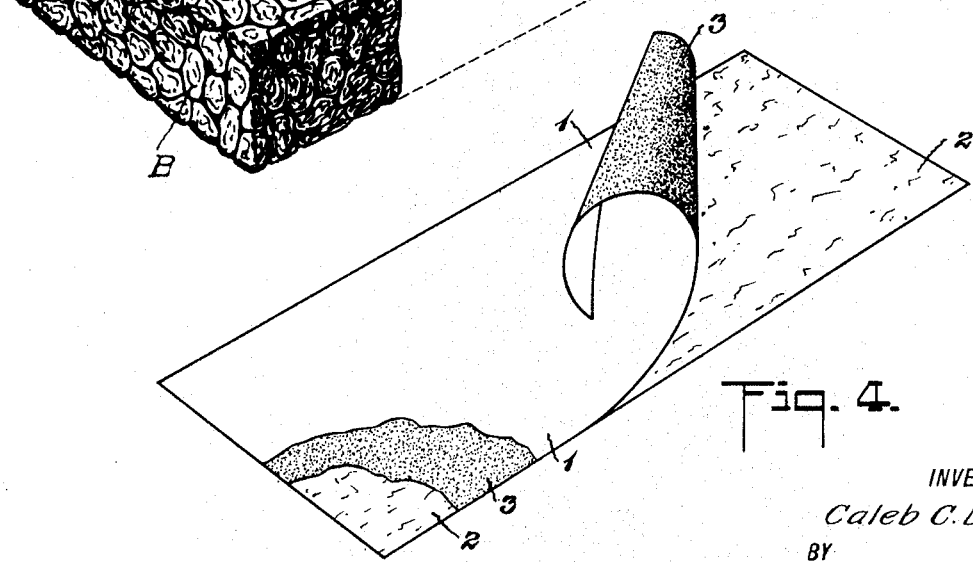
INVENTOR
Caleb C. Dula
BY
Meyers & Cavanagh
ATTORNEYS May 19, 1925.                                                    1,538,277
C. C. DULA
ART OF PACKING AND PRESERVING FRUITS AND
OTHER FOOD PRODUCTS AND COMMODITIES
Filed Feb. 8, 1924          3 Sheets-Sheet 2
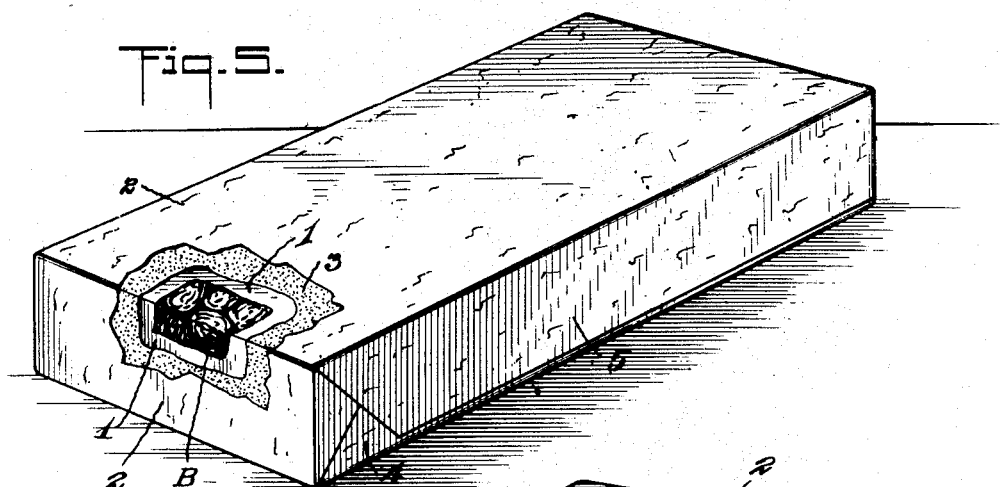
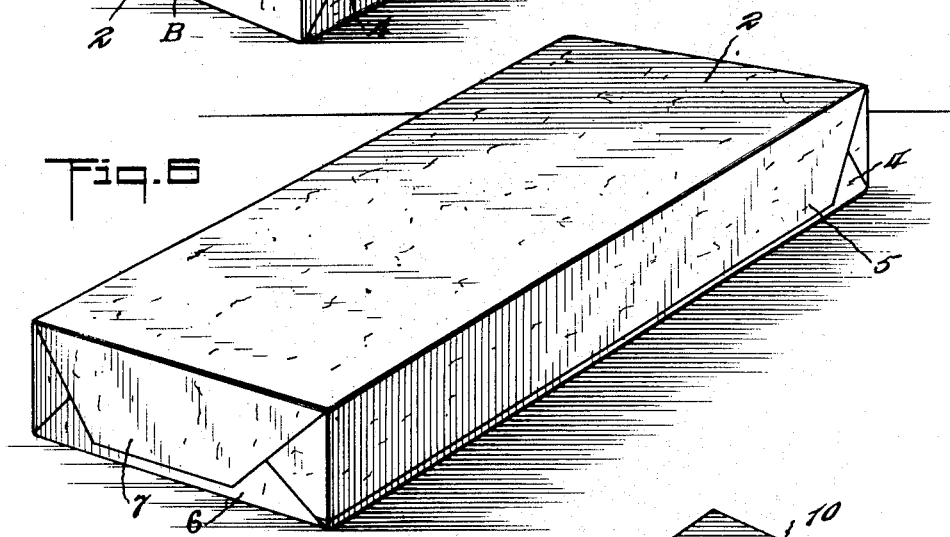
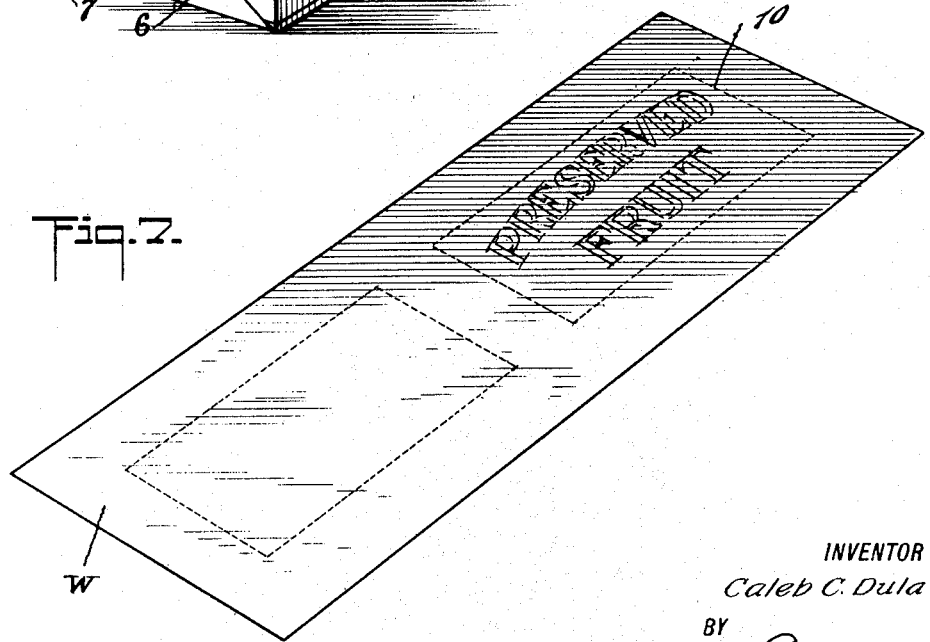
INVENTOR
Caleb C. Dula
BY
Meyers & Cavanagh
ATTORNEYS May 19, 1925. 1,538,277
C. C. DULA
ART OF PACKING AND PRESERVING FRUITS AND
OTHER FOOD PRODUCTS AND COMMODITIES
Filed Feb. 8, 1924   3 Sheets-Sheet 3
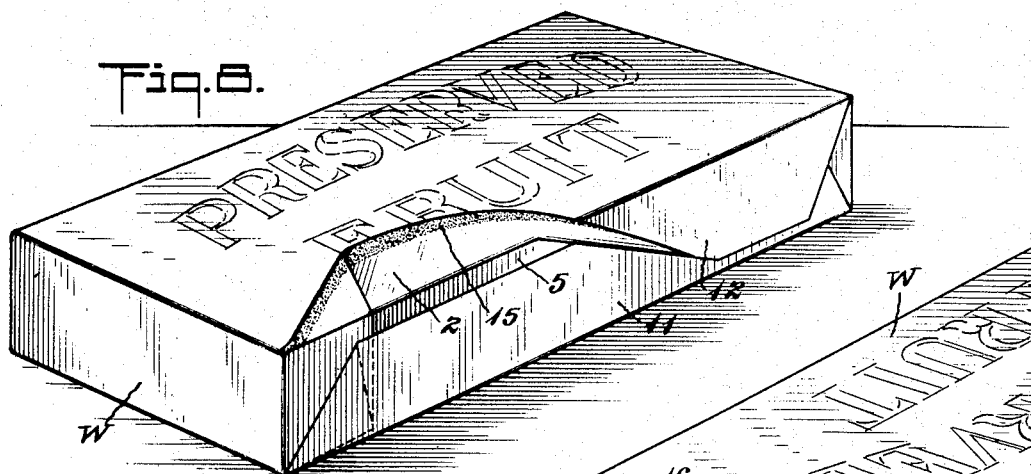
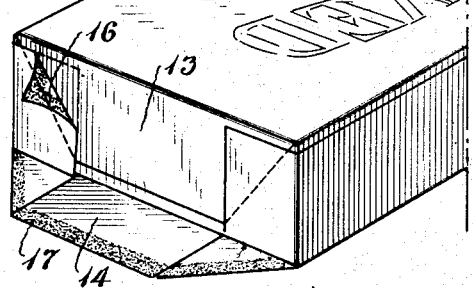
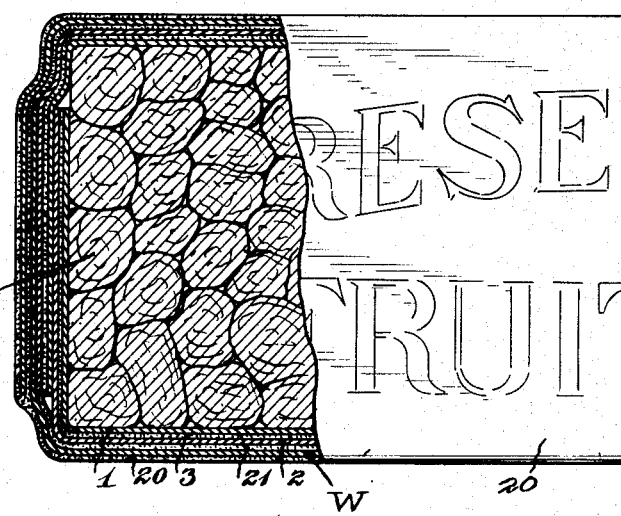
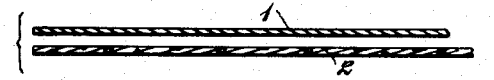
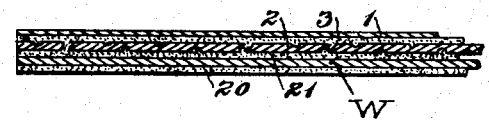
INVENTOR
Caleb C. Dula
BY
Meyers & Cavanagh
ATTORNEYS Patented May 19, 1925.

1,538,277

UNITED STATES PATENT OFFICE.

CALEB C. DULA, OF YONKERS, NEW YORK.

ART OF PACKING AND PRESERVING FRUITS AND OTHER FOOD PRODUCTS AND COMMODITIES.

Application filed February 8, 1924. Serial No. 691,381.

*To all whom it may concern:*

Be it known that I, CALEB C. DULA, a citizen of the United States, and resident of Yonkers, in the county of Westchester and State of New York, have invented certain new and useful Improvements in the Art of Packing and Preserving Fruits and other Food Products and Commodities, of which the following is a specification.

My invention relates to the art of packing and preserving fruits and other food products and commodities.

The principal object of the invention is to provide a method and a package or container by means of which various commodities may be packed and preserved, usually in relatively small quantities suitable for retail vending to individual consumers, in a very economical manner and in a practically hermetically sealed and insect-proof condition, with retention of the original moisture content of the commodity, or with substantially complete exclusion of air and external moisture, so that the commodity will remain in its original fresh, clean, and uncontaminated condition for indefinite periods.

A further object is to provide at the same time a novel package or container of attractive and decorative appearance, which is preferably so arranged or constructed that while the wrapper or container together with the enclosed commodity is sufficiently rigid to retain its proper form and to withstand the strains or wear and tear of shipment and handling, it is to a substantial degree resilient, flexible or compressible, and in the case of many commodities permits the condition of the commodity to be ascertained by handling the package, as further explained hereafter.

Various commodities, and especially food products including fruits, have been hermetically sealed in cans, and this method of packing is satisfactory for many purposes; but such containers and the packing methods involved in their use are expensive and the container moreover adds very greatly to the weight of the commodity, and such cans are not readily available in some of the forms desirable for retail vending of certain commodities. These commodities have also been enclosed in relatively heavy flexible sheet metal, such as thick foil or sheet lead, but these materials are also unduly expensive and heavy and the utility of such packages is greatly restricted because the material is not readily workable into package or container form by simple machinery.

Many commodities or cartons containing commodities have been enclosed in single or composite paper wrappers, constituting what are generally known as "sealed-wrapped" packages, in which the wrapper is secured to the carton, or the laps and folds of the wrapper are secured together, by adhesives in the general class of glue. Glues when dry usually become flaky or brittle, and this tends to impair the connection of the wrapper to the carton or other inner container or to cause disconnection or loosening of the wrapper laps and folds, and moreover paper wrappers are usually quite porous, and unless especially treated do not hermetically seal the package. Single or composite waxed paper wrappers have been proposed and used to some extent, but it is very difficult to adhesively secure such waxed sheets to a carton or other inner container and to secure together the laps and folds of the wrapper itself, since ordinarily-available adhesives will not adhere readily to the waxed surfaces. Single or composite paper wrappers, either in ordinary condition or treated with wax, do not without definite fastening remain in proper position after they are folded about an article or commodity to serve as an inner wrapper over which an outer wrapper will presently be placed. As above explained, waxed paper cannot readily be secured by ordinary adhesives, and therefore if waxed paper is used as the inner wrapper, it is difficult or impossible in any practical way to secure its laps and folds until the outer wrapper can be applied. In the case of a multiple inner wrapper, whether of paper or paper and foil, if the sheets or plies are secured together by ordinary adhesive, the adhesive itself is not easily susceptible to folding or creasing, and the act of folding or creasing frequently cracks or breaks the film of glue between the plies and incidentally tends to rupture the paper or the foil.

Various methods and package or container forms have been provided in which thinner metal foil is used, of a thickness which makes the use of such foil an economical possibility for many purposes, but for modern conditions under which packaged goods are produced in immense numbers, it is practically necessary that the container materials or wrappers shall be capable of being handled in part or entirely by automatic machines in the packaging operations, and for that purpose the metal foil must be made very thin and when so made, while apparently the foil sheets are continuous and impervious, they actually contain, frequently, more or less minute cracks or porosities, and it is requisite moreover for successful handling that the thin foil be reinforced and for that purpose, in some cases, the foil is adhesively secured to paper producing a composite sheet in which the combined materials can be handled by automatic machines. It has been customary, however, to secure the foil to the paper by an interposed complete glue coating or by stripes of glue, and this is satisfactory so far as the connection of the sheets is concerned, but glues ordinarily employed for this purpose in drying become brittle, and tend to break or puncture the foil, especially when the composite sheet is manipulated and folded, by hand or machinery.

No package or container, or packaging method has, however, been suggested, according to my knowledge, which takes advantage of or properly combines the desirable qualities of frail metal foil with paper reinforcement, and the paraffined or wax-sealed wrapper, for the purpose above stated.

With the previously stated general objects of the present invention in view, I have, after protracted study and experiments, discovered that the various disadvantages of previous methods and packages can be avoided, and the stated and other objects and advantages attained, by the proper treatment or arrangement of the commodity itself and the proper combination with the commodity (or with an article such as a carton in which practically any commodity may be enclosed) of a composite inner wrapper composed of a sheet of thin, frail foil and a sheet of waxed paper, or paper adherently secured to the foil by interposed wax, which acts not only as a suitably flexible adhesive, but effectively coats one surface of the foil and seals the cracks, porosities or other imperfections therein, and an outer wrapper of paper or analogous material which is usually applied over the inner wrapper while in its untreated or originally porous condition, with overlapped margins or folds which are secured by glue; and then a suitable wax, such as paraffin is applied in hot or melted condition over the outer surface of the outer wrapper to penetrate and hermetically seal and further secure the same.

The composite inner wrapper of foil and paper secured together by a flexible adhesive can be readily handled, bent and folded by machinery or hand operations without risk of tearing or cracking the foil, and has the further advantage that when properly folded about the commodity or inner carton, it will, by reason of the ductility and capacity of the foil to remain in any position in which it is placed, remain in proper folded condition about the commodity or carton, until the outer wrapper is applied, and therefore any difficulty heretofore experienced in securing the parts of an inner wrapper by adhesive are entirely avoided. The paper layer of the composite inner wrapper is usually placed next to the commodity or carton and the foil layer is then outward. Since the outer wrapper is preferably applied in the ordinarily porous condition of paper, without any wax or other coating which would interfere with the adhesive connection of the wrapper parts by any ordinary or suitable glue, such readily available glues easily adhere to the wrapper and secure its laps and folds positively in position so that the wrapper entirely and securely covers the inner wrapper and protects it from injury. When the wax coating is applied to the outer wrapper in hot or melted condition it permeates the wrapper and a substantial amount of the wax penetrates to and covers the outer surface of the foil layer of the inner wrapper, forming an adhesive connection between the outer wrapper and the foil over the entire outer surface of the latter, and moreover this wax thoroughly coats and seals the outer surface of the foil so that in connection with the seal afforded by the wax interposed between the foil and the inner paper sheet, the foil is completely coated and flexibly reinforced with material which penetrates or fills and seals all of the minute porosities or imperfections of the foil and enables the natural protective, moisture, insect and germ proof characteristics of the thin sheet metal to be utilized to the best advantage. As a particular example of such a method and package, the invention as performed or embodied in one preferred way, and for one typical food product such as raisins or analogous partly dried or sun-cured fruits, consists, as specifically embodied herein, of a quantity of the food articles such as raisins, prunes, dates, figs, apricots, peaches or the like moderately compressed into a compact mass of convenient shape, usually rectangular or oblong, the compression pressure being, however, not sufficient to destroy the identity or form of the individual fruits or to break their pellicles. This mass of fruit in its originally fresh and moist condition, and in quantity suitable for retail vending, is first enclosed in a composite wrapping of relatively thin metal foil, such as ordinary commercial "tinfoil", secured to a reinforcing sheet of suitable paper, usually relatively thin and tough paper, the adhesive connection of the foil and paper being obtained, not by an ordinary cement or glue, but by a suitable wax such as paraffin, this wax being preferably applied to the surface of the paper which comes in contact with the foil so that while the paraffin substantially permeates the paper there is usually no appreciable free paraffin on the paper surface away from the foil, but a substantial coating of paraffin intervenes between the paper and foil and adhesively secures the sheets together with sufficient tenacity, and this paraffin layer or coating moreover effectively seals or closes the minute cracks or porosities in the thin foil when any such are present and enables the protecting and sealing qualities of the thin metal layer to be utilized to the fullest extent. This composite inner wrapper is capable of being handled in semi-automatic or automatic machines and the packaging operation can therefore be performed with maximum economy in accordance with modern production methods. While in some cases, when the commodity is compressed as above stated, the compression may be effested before the commodity is associated with the inner wrapper, in other cases the compression may be effected substantially concurrently with the association of the commodity and wrapper, or while the wrapper is being formed or folded about the commodity.

The wrapper is of sufficient size to completely enclose the commodity, with overlapping margins or folds; and while in some cases this inner wrapper may be sealed as by heat treatment or the application of additional parafin over exposed wrapper margins or folds, it is usually unnecessary, in view of further operations, to definitely seal the inner wrapper.

An outer wrapper is then applied, which is preferably paper of suitable quality, usually paper of substantial thickness and toughness, and usually printed or otherwise provided with suitable decorative designs, trade-marks or advertising indicia, this wrapper being large enough to completely cover the inner wrapper with overlapping margins or folds. The completely wrapped package is then treated by dipping, spraying or brushing, with a suitable sealing material, preferably a wax, such as paraffin, which renders the entire outer wrapper impervious to moisture, insects or even bacteria. At the same time this wax treatment may in some cases render the outer wrapper semi-transparent or translucent, so that the color and lustre of the underlying metal foil is partly visible through the outer wrapper, and by variations in the color of the foil and wrapper, various novel, pleasing and decorative package color effects may be obtained.

The completed package on account of its insect and germ proof characteristics absolutely prevents the contamination of the commodity by bacteria or insect development, since it has been demonstrated by tests that with food commodities including fruits of the character described, in ordinary good condition when packed, no insect life or bacterial development appears in the commodity after a long period of preservation. The original moisture content of the commodity is retained (and conversely the accumulation of any moisture from atmosphere is prevented) so that when the package is opened the individual fruits can be readily separated from the moderately compacted mass and it is thereupon found that the original form and identity of the fruits, such as raisins, prunes or the like, has not been destroyed; they are readily separated from each other and the skins are not broken, and in brief, the fruit is practically in original condition.

In distinction from many classes of canned or packaged goods, the package, while sufficiently stiff or rigid for convenient handling and amply resistant to any strains or damage incurred in packing and shipping, is appreciably flexible or compressible, so that by moderate finger pressure on opposite sides of the package, it can be compressed and the originally fresh and pliant condition of the commodity can be "felt" by the purchaser. This is one distinctive characteristic of the package.

While the above-described structure and method are preferred in many cases, for instance, for food products of the character described, in the broader aspect of the invention many variations may be made. For instance, for other commodities including food products, such as breakfast foods, meal or flour, or whenever it is not considered especially necessary to be able to detect the condition of the contents by the sense of "feeling," the package may be made more stiff or rigid; for example, the commodity may be first placed in a relatively stiff inner container, such as a cardboard carton, and the carton may then be enclosed in a composite wrapper or foil and paper, and the outer wrapper applied and sealed with paraffin or other wax as above described.

In cases where the commodity is preferably in a dry or crisp condition, the moisture-proof qualities of the package or container serve to prevent access of moisture to the commodity from the outside air.

The characteristics and advantages of the invention are further sufficiently explained in connection with the following detail description of the accompanying drawings, which show one exemplifying embodiment of the invention. After considering this embodiment, in view of the preceding and following description, skilled persons will understand that many variations may be made, and I contemplate the employment of any methods or structures that are properly within the scope of the appended claims.

Fig. 1 is a perspective view of a complete package embodying the invention in one form, with some parts broken away.

Fig. 2 shows that end of the package which is not visible in Fig. 1.

Fig. 3 is a perspective view of a small quantity of a representative commodity, namely, a food product such as raisins, arranged for packing in accordance with my method or package structure.

Fig. 4 shows a composite inner wrapper.

Fig. 5 shows an embyro package consisting of the commodity enclosed in the inner wrapper.

Fig. 6 shows that end of the embyro package which is concealed in Fig. 5.

Fig. 7 shows an outer wrapper.

Fig. 8 shows the embyro package enclosed in the outer wrapper, a part of which is left in abnormal position for explanatory purposes.

Fig. 9 shows that end of the package which is concealed in Fig. 8. with a part of the outer wrapper in a partly-folded condition for explanatory conditions.

Fig. 10 is a transverse section through the completed package.

Fig. 11 shows in section the component material of the inner wrapper prior to their connection or treatment of the paper as waxed.

Fig. 12 shows the complete inner wrapper with the materials wax treated and adherently connected.

Fig. 13 shows the complete wrapper including inner and outer wrapper materials wax treated and adherently connected.

Fig. 1 shows one typical complete package embodying the invention, the packaged commodity in this case being raisins, which are representative of a considerable class of similar food products, including dates, figs and various other partially dried or sun-cured fruits including apricots, peaches and the like. Almost any commodity may be substituted, such as other food products or even non-edible commodities, and when the nature of the commodity is such that it cannot conveniently be compacted or pressed into a substantially homogenous mass, the commodity may first be enclosed in any suitable container, such as a cardboard carton, and the container materials utilized in my invention may then be applied to the carton substantially as they are in this case applied directly to the food product.

In the present specific example of the package and method, the commodity is first compacted by moderate pressure into a convenient form, such as the rectangular block B, Fig. 3, consisting in the present case of raisins which vary in size but are of approximately spherical shape, partly dried and yet somewhat moist or glutinous in their inner composition. The fruit is not compressed sufficiently to entirely deform it, to break the skins or destroy the identity of the separate fruits, but sufficiently to produce a substantially unitary or homogeneous block, which is conveniently of rectangular form and of a quantity suitable for readily vending, say in a particular case, one pound of raisins.

Subject to the character of packaging machinery available, or packing methods which may be most desirable in a particular case, the commodity may be compacted as shown as an entirely preliminary operation, or in connection with the association with it of the inner wrapper, or as the wrapper is partly folded about the mass of fruit.

A suitable composite inner wrapper is shown in Fig. 4, consisting of a sheet of paper 1, which may be of any suitable grade or moderate thickness and which has considerable strength and toughness, a sheet 2 of metal foil, such as commercial tin foil, preferably a thin grade of foil for the sake of economy, lightness and easy conformity to the wrapping operations. The paper and foil are secured together by an interposed adhesive layer 3, which is usually of a typically waxy nature, such as a composition including wax, or a substantially pure wax, such as paraffin. The wax is usually supplied or applied in such a way that it does not appear to any appreciable extent on the free surface of the paper (although the presence of a substantial wax film on the free paper surface is not objectionable in many cases) but so that it substantially permeates the paper and forms a layer or film of appreciable thickness on the surface which is adjacent the foil and so that an adequate body of the wax thoroughly covers, coats and seals the foil surface and practically fills or closes any cracks or porosities which are frequently present in the foil.

The parts of the inner wrapper may in some cases be separately applied to and formed about the commodity B, or otherwise the composite inner wrapper may be provided as a finished product.

The wax when cool has considerable flexibility and may be folded or creased in the proper formation of the wrapper about the commodity without cracking or breaking and without producing any sharp fragments of adhesive which tend to rupture the foil. Fig. 5 shows the inner wrapper completely folded about the commodity according to one suitable method, in acordance with which overlapping side folds 4 and 5 are produced at both narrow sides of the embryo package, and overlapping end folds 6 and 7 are produced at one end. Any suitable fold arrangement may be provided so long as the wrapper, preferably, completely encloses the commodity, with overlapping margins or folds. Owing to the flexibility of the wax adhesive and paper, and the ductility of the foil and its tendency to retain any bends or folds that may be made in it, the wrapper is well able to retain its folded form, as shown in Figs. 5 and 6, for any reasonable length of time and until it is enclosed in the outer wrapper, and it is unnecessary to adhesively connect the laps or folds of the inner wrapper. Any delay, expense or annoyance incident to gluing the inner wrapper, and any difficulties such as have heretofore been experienced in attempting to glue waxed wrapping materials, are entirely avoided.

A suitable outer wrapper W, as shown in Fig. 7, may consist of a single piece of paper of any ordinary or suitable grade or quality, usually of moderate but substantial thickness and of considerable strength or toughness. The paper is preferably furnished in an ordinary condition, that is to say, it is not treated with wax or other adhesive prior to the incorporation in the package. Usually the wrapper is printed on one surface with any suitable indicia 10. The wrapper is applied to and folded about the embryo package in any suitable way. In the example shown, the outer wrapper is formed or folded about the package in the same fashion as the inner wrapper, with the production of overlapping side folds 11 and 12 on both narow sides of the package and overlapping end folds 13 and 14 at one end only. Evidently the manner of applying and folding the wrapper may vary considerably, so long as, preferably, overlapping margins or folds are provided to insure a complete and secure enclosure of the embryo package consisting of the commodity and inner wrapper.

The overlapping wrapper portions are secured together by a suitable adhesive applied in any convenient way in the form of spots, zones or stripes 15, 16, 17, sufficient to adequately secure the wrapper portions together. The adhesive may be applied to all the overlapping wrapper portions, or to only some of them since the adhesive application is only necessary in certain cases as a more or less temporary measure to secure the wrapper parts until they are further secured by an outer coating referred to just below. Otherwise the adhesive may be depended upon to provide for the secure and permanent connection of the wrapper parts and to avoid placing dependence upon the subsequently applied wax coating for that purpose. There is no difficulty connected with the adhesive connection of wrapper parts, since the wrapper is applied in its ordinary porous condition, and it is easily secured with any suitable or ordinary available adhesive.

The completely wrapped and glued package is then coated in any convenient way, as sufficiently indicated in Figs. 1 and 2, with a suitable protective or moisture-proof material 20, usually a waxy composition, or a substantially pure wax, such as paraffin, which is applied in a heated or melted condition in sufficient quantity to thoroughly coat the outer wrapper and to fill the joints at the edges of overlapping wrapper portions and also, preferably, to thoroughly permeate the wrapper and form on the inner surface thereof, a film 21 of substantial thickness, which causes the outer wrapper to adhere to the foil over the entire surface of the latter, and also coats the entire exterior surface of the foil and fills or seals any cracks or porosities therein, and together with the wax coating on the inner foil surface provides for the complete coating and sealing of the foil on both sides with the effect of practically eliminating any disadvantages of imperfections in the foil.

The exterior wax coating when cool forms a complete external hermetic seal with an ample quantity of the wax in the joints or crevices of the outer wrapper surface, and this is in addition to the protective and sealing effect of the metal foil, wax-coated on both of its surfaces, and also the inner waxed paper sheet. It has been found that for long, and practically indefinite periods, commodities so packaged will remain in their original fresh and moist, or dry condition, depending on the original condition of the material, the escape of moisture from or access of it to the package contents being entirely prevented; the package is completely proof against the entrance of insects and the deposit of eggs thereby and is, in fact, practically, if not absolutely proof against the entrance of bacteria or germs. It has also been found in actual practice that many food products which are ordinarily very susceptible to insect contamination, such as the weevils or small beetles which develop from the egg stage in various commodities including flour, meal, various grains, etc., when packaged in accordance with this invention, are entirely free from such insect development or contamination; and tests show that even when the insect eggs are presumably present in the commodity when packaged they are unable to develop in a commodity which is so perfectly sealed against access of fresh air and against moisture variation.

The application of wax to the outer wrapper renders the latter substantially translucent so that the underlying foil with its usually highly polished metallic surface is partially visible through the wrapper, or the light reflection from the foil combines with the color or optical effect of the wrapper and produces a novel, pleasing and decorative appearance, which adds greatly to the attractiveness and sales value of the package.

An important advantage of packages constructed as described, is that while sufficiently strong and rigid to resist the strains or damage of packing and shipment, they are to a substantial extent resilient or compressible, and therefore, in the case of many commodities, such as raisins, prunes, dates, figs, etc., the intending purchaser can determine the fresh condition of the enclosed commodity by pressing opposite sides of the package, and the resilient yielding of the enclosed mass of fruit under moderate finger pressure indicates in the clearest possible way that the fruit is in its original fresh, moist and edible condition.

When the package containing raisins or similar fruits is opened, it is found that the compact fruit mass is easily separated into small portions or individual fruits, which retain their individual character with unbroken skins and without any considerable deformation, and particularly that the fruit retains its proper moisture content and is in every respect, from the standpoints of appearance and edibility, in the same condition as it was when packed. Similarly, other commodities whether moist or dry when in their preferred condition, are so maintained in the package for indefinite periods, the only requirement being that they shall be properly conditioned at the time of packing.

While I have stated above that the foil sheet of the inner wrapper is usually placed outward, and this is the preferred arrangement in many cases for reasons given, in other cases the foil may be placed next to the commodity and I have employed this arrangement in certain cases for this arrangement.

What I claim is:

1. The method of preserving commodities which includes enclosing the same in a wrapper composed of superimposed layers of foil and paper connected throughout by a waxy material between the foil and paper, completely enclosing the embryo package in an outer wrapper of paper and treating the outer wrapper with a waxy substance in a fluid state, thereby to thoroughly impregnate the outer wrapper and seal it to the inner wrapper.

2. A commodity package for retail vending, including a selected quantity of the commodity, a composite wrapper of superimposed layers of foil and paper connected throughout by an interposed waxy material, an enclosing wrapper of paper, and a coating of waxy material applied to the outer wrapper in a fluid state, thereby to thoroughly impregnate the same and seal it to the inner wrapper.

Signed at New York city, in the county of New York and State of New York this first day of February, A. D. 1924.

CALEB C. DULA.